United States Patent [19]

Rugh II, deceased et al.

[11] 4,357,209
[45] Nov. 2, 1982

[54] NUCLEAR DIVISIONAL REACTOR

[76] Inventors: John L. Rugh II, deceased, late of Johnstown, Pa.; Ailsa P. Rugh, administratrix, R.D. #5, Menoher Heights, Box 128, Johnstown, Pa. 15905

[21] Appl. No.: 111,944

[22] Filed: Jan. 14, 1980

[51] Int. Cl.³ .......................................... G21C 15/00
[52] U.S. Cl. ..................................... 376/391; 376/373
[58] Field of Search ............................ 176/65, 54, 56

[56] References Cited

U.S. PATENT DOCUMENTS 3,180,802 4/1965 West ..................................... 176/56
4,102,752 7/1978 Rugh ..................................... 176/39

Primary Examiner—Donald P. Walsh

Attorney, Agent, or Firm—Shlesinger, Arkwright, Garvey & Dinsmore

[57] ABSTRACT

A nuclear divisional reactor including a reactor core having side and top walls, a heat exchanger substantially surrounding the core, the heat exchanger including a plurality of separate fluid holding and circulating chambers each in contact with a portion of the core, control rod means associated with the core and external of the heat exchanger including control rods and means for moving said control rods, each of the chambers having separate means for delivering and removing fluid therefrom, separate means associated with each of the delivering and removing means for producing useable energy external of the chambers, each of the means for producing useable energy having separate variable capacity energy outputs thereby making available a plurality of individual sources of useable energy of varying degrees.

19 Claims, 3 Drawing Figures

NUCLEAR DIVISIONAL REACTOR

FIELD OF INVENTION

This invention relates to nuclear divisional reactors and more specifically to a multiple energy source system in which the various energy sources may be varied with respect to each other.

HISTORICAL BACKGROUND

In the past nuclear reactors have generally been available so as to furnish a single source of energy direct from the reactor without permitting various other sources in contact with the reactor and wherein the reactor is positioned substantially within a boiler chamber as disclosed in my U.S. Pat. No. 4,102,752 of July 25, 1978. In recent times research effort has been directed towards improving municipal and agricultural water supply systems. In these systems there has been a need for applying heat from the reactor directly to other energy areas at varying temperatures other than that which would be used in the production of potable water. Thus the reactor could be producing water supply for potable purposes but also utilized for other energy outputs such as the generation of electrical power or the use of high temperatures in chemical reactions and the like. At present a source of heat energy supply is necessary for each particular system utilized. Thus a series of reactors must be provided to produce different types of useable energy.

The present invention overcomes the disadvantages of the prior art by providing not only a water supply system but also a means for converting nuclear power to other types of power for use in chemical industries, electrical generating systems and the like.

Accordingly, it is the primary object of this invention to provide a municipal water supply system in conjunction with other systems which are tied into a single nuclear reactor.

Still a further object of this invention is to provide a nuclear reactor system which includes a divisional member surrounding the reactor which allows for separate and distinct operations resulting from the heat generated at different surface areas of the core.

Another object of this invention is to provide a series of independent systems which are simple and easily operated separately one from the other yet involving a single nuclear reactor.

Yet a further object of this invention is to provide a compound system which is compact and produces multiple sources of energy useable in various areas independent one from the other.

These and other objects of this invention will be apparent from the following description and claims.

In the accompanying drawings which illustrate by way of example various embodiments of this invention.

FIG. 1

Figure 1:
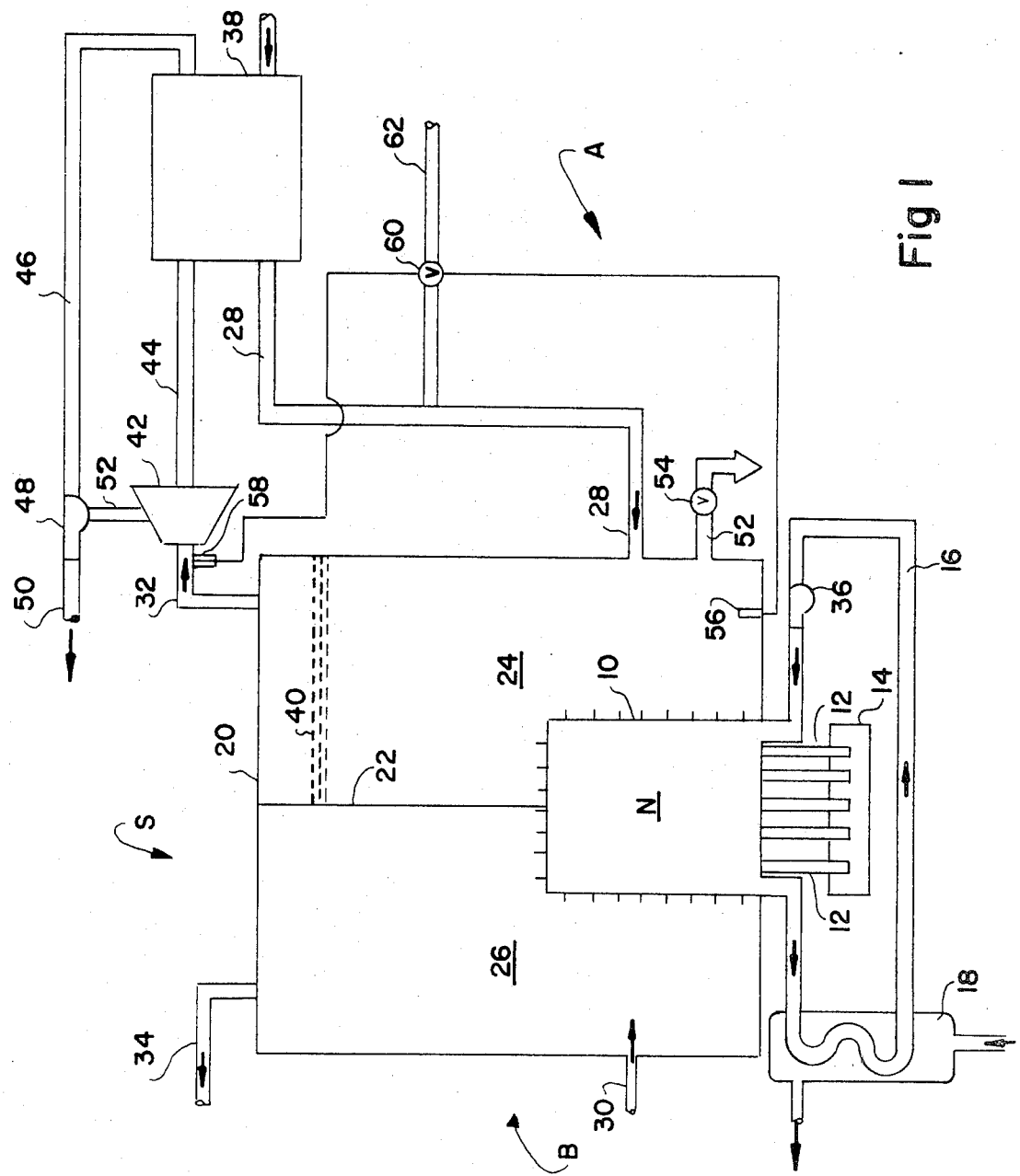
FIG. 1 is a diagrammatic view in part showing in plane this invention.

FIG. 1 shows in detail one form of the invention. In the system designated as S we will treat that portion of the system on the right designated as operating unit A and that part of the system on the left designated as operating unit B. The nuclear reactor is generally designated as N and includes radiating fins 10 and nuclear rods 12 with a motor drive mechanism 14 for moving the rods in and out of the reactor N. A coolant circulating system 16 maintains the nuclear reactor at a safe temperature level. A heat exchanger 18 may be provided adjacent the reactor for assisting and maintaining the coolant circulating system. Surrounding the system S and incorporating the operating units A and B is a partitioned jacket 20 having a partition 22. The right hand chamber 24 may be used in the manner set out in U.S. Pat. No. 4,102,752. The left hand chamber 26 may have an operating unit similar to operating unit A for right hand chamber 24 or it may have an entirely different operating system for receiving a different type of circulating material such as sulfur, mercury, sodium, alcohol, or other various types of organic or inorganic liquids or gases as the case may be for taking advantage of temperature transfer capabilities within the system as differing from the operating unit A. Intakes 28 and 30 deliver fluids to chambers 24 and 26 respectively and discharges 32 and 34 discharge heated fluid from the right and left hand chambers 24 and 26 respectively to the operating units A and B respectively. It will be obvious that the coolant circulating system 16 should include some type of pump 36. It should be noted that the bottom of the nuclear reactor core N is not encased by the left and right hand chambers 24 and 26.

Operating unit A for example would take in sea water or the like through intake 28. Preferably the incoming sea water is preheated in a heat exchanger 38 to a temperature of at least 125° F. and preferably greater than 150° F. The preheated sea water passes through the conduit 28 into the boiler chamber 24. The reactor N may be either fission or fusion type as is known the art. The liquid level 40 in the boiler chamber 24 should be maintained at a level so as to completely surround the core of the reactor N.

As the liquid in the chamber 24 is heated by the reactor N, steam is generated and heated to a temperature of at least about 250° F. and may be considerably higher depending upon the liquid used for generation.

A superatmospheric pressure would be required for assuming much higher temperatures such as 1,000 degrees or more.

The high temperature high pressure steam passes out of the boiler 24 through the conduit or discharge 32 to an expansion turbine 42 of known construction. In driving the turbine 42, the steam is cooled to about the boiling point of water and the prevailing atmospheric pressure and the steam is exhausted from the turbine 42 through the line 44 whereby it is conveyed into a heat exchanger 38. Of course heat exchanger 38 is illustrated schematically but in the heat exchanger 38, the steam exhausting from the turbine 42 is maintained in heat exchange contact with the incoming sea water supplied through the intake pipe 28. The steam in the heat exchanger 38 is cooled and condensed to the extent that the exit line 46 carries potable water, i.e. water at a temperature of about 70°-80° F. This water is delivered by the exit line 46 to a pump 48 capable of delivering a high volume of water under pressure through line 50 to a municipal or agricultural water distribution network. The pump 48 is operatively connected to and driven by the turbine 42 by means of a shaft 52 or other similar such connection. Of course reduction gearing may be utilized between the turbine 42 and pump 48 but such an arrangement is known in the art. Steam leaving the boiler 24 through the line 32 is of course substantially pure water having been distilled from the sea water. As the pure water is removed, the concentration of salts in the boiler 24 increases. Periodically, the concentrated salt solution is drawn off through the line 52 upon opening of the valve 54. The solution which would be drawn off in this manner is highly concentrated in various salts contained in the sea water and it has been found desirable that this highly concentrated solution may be evaporated to dryness or otherwise dried to produce salt for use on roads or the like.

In order to provide a control over the temperature of the system, thermal sensors 56 and 58 are utilized. Sensors may be provided in other portions of the system. These sensors are connected to a thermal responsive valve 60 and may be of an electrical or thermal coupled type such as bimetallic elements or the like.

Valve 60 is normally closed so that all incoming sea water passes through the heat exchanger 38 to be preheated as mentioned previously. Sensors 56 and 58 indicate a rise in temperature beyond thermal capabilities of the system permitting valve 60 to open allowing cold sea water to flow through the by-pass line 62 directly into the feed line 28 without being preheated in the heat exchanger 38. Sea water is typically in a temperature of 40° to 50° and a rapid cooling of the system will occur. Other safe guards can be included which are known in the art.

It will now be obvious that instead of utilizing sea water, another type of fluid can be utilized which can be pumped in on the other side of the reactor and in the area of the operating unit B. The system may vary as far as the operation is concerned and as far as the driving capability or the means for taking heat off or the like.

FIG. 2

Figure 2:
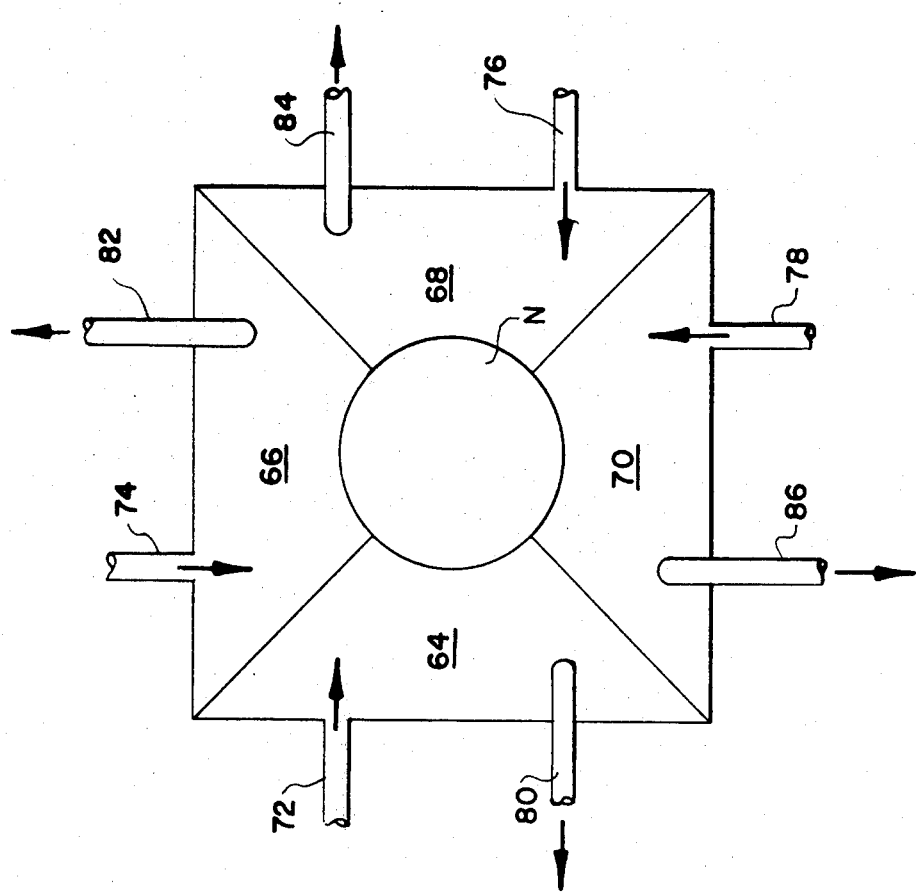
FIG. 2 is a fragmentary plane view diagrammatically showing a modification of the invention.

FIG. 2 shows the reactor N partitioned in four separate chambers 64, 66, 68 and 70. Intake lines 72, 74, 76 and 78 are provided for each of the chambers and discharge lines 80, 82, 84 and 86 are provided for purposes as will be obvious from the aforementioned description of operation. It will be noted in FIG. 2, that the chambers allow for various fluids to be pumped in of different consistencies temperature values and the like.

FIG. 3

Figure 3:
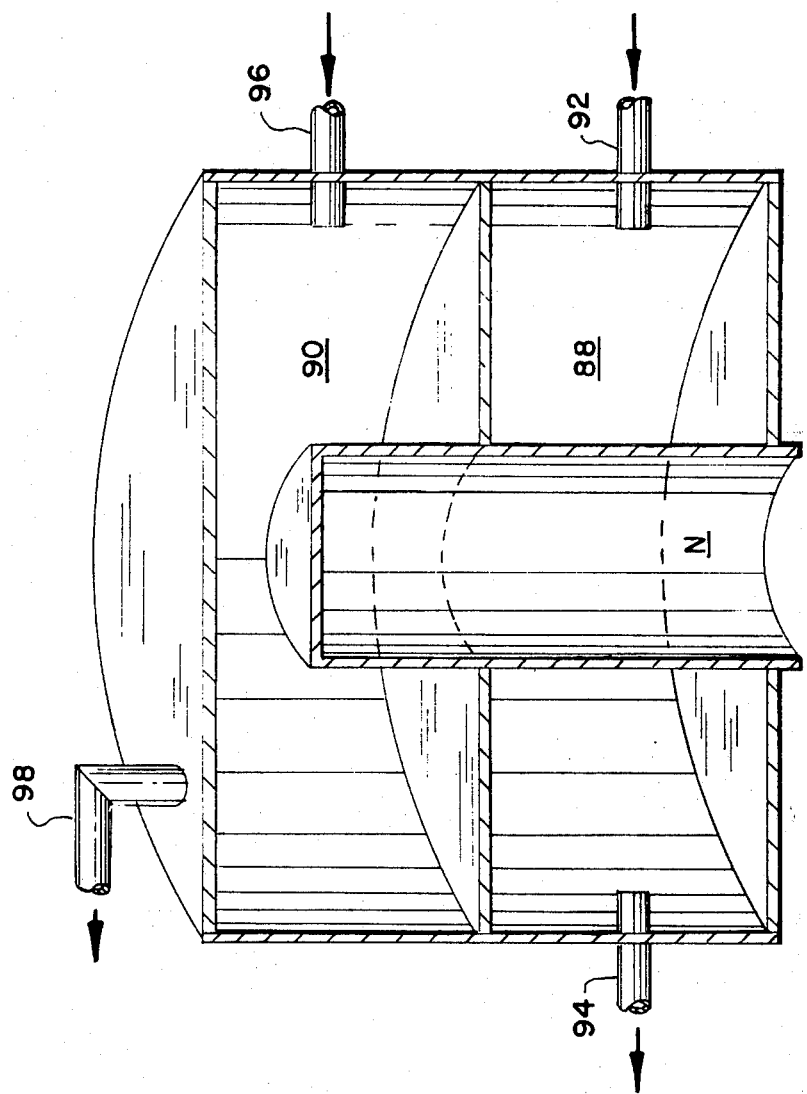
FIG. 3 is a cross sectional view in fragment showing yet a further modification of this invention.

In FIG. 3, it will be noted that instead of the chambers being set out in a quadrant form as shown in FIG. 2, the chambers might be constructed in a stacked arrangement so that the reactor end may be provided with one or more chambers such as 88 and 90. The chambers could be divided as in FIG. 2 or they could be further horizontally divided making an additional stacked series. It will be obvious that various combinations could be worked out in this regard. It will be noted that chamber 88 includes an intake 92 and a discharge 94. Further chamber 90 includes an intake 96 and a discharge 98 similar and for the same purposes of those previously described.

It is of special interest that each of the producable energy units will have a separate variable energy output control so as to make available a plurality of individual sources of useable energy each of varying degrees yet all from a single reactor.

While this invention has been described as having a preferred design, it will be understood that it is capable of further modification. This application, is therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A nuclear divisional reactor including:
   (a) a reactor core having side and top walls
   (b) a closed nuclear reactor coolant circulating system for said reactor core and forming a part of said reactor core
   (c) a heat exchanger substantially surrounding said core
   (d) said heat exchanger including a plurality of separate fluid holding and circulating chambers each in contact with a portion of said core
   (e) said closed nuclear reactor coolant circulating system for said reactor core being separate and independent from said plurality of separate fluid holding and circulating chambers of said heat exchanger surrounding said core
   (f) control rod means associated with said core and external of said heat exchanger including control rods and means for moving said control rods
   (g) each of said chambers having separate means for delivering and removing fluid therefrom
   (h) separate means associated with each of said delivering and removing means for producing usable energy external of said chambers
   (i) each of said means for producing usable energy having variable capacity energy output
   (j) thereby making available a plurality of individual sources of usable energy of varying degrees.

2. A nuclear divisional reactor as in claim 1 and wherein:
   (a) said reactor core includes a base, and
   (b) said closed nuclear reactor coolant circulating system for said reactor core includes means at said reactor core base only for delivering and removing reactor coolant from said reactor core.

3. A nuclear divisional reactor as in claim 1 and wherein:
   (a) each of said plurality of holding and circulating chambers extend outwardly from said core a distance at least approximately the width of said core.

4. A nuclear divisional reactor as in claim 1 and wherein:
   (a) each of said plurality of holding and circulating chambers contact a portion of said side and top walls.

5. A nuclear divisional reactor as in claim 1 and wherein:
   (a) each of said plurality of holding and circulating chambers contact a porton of said side walls.

6. A nuclear divisional reactor as in claim 1 and wherein:
   (a) at least one of said plurality of holding and circulating chambers contact a portion of said side walls.

7. A nuclear divisional reactor as in claim 1 and wherein:
   (a) least one of said plurality of holding and circulating chambers contacts a portion of said top and side walls.

8. A nuclear divisional reactor as in claim 1 and wherein:

(a) said holding and circulating chambers including different heat transfer compositions.

9. A nuclear divisional reactor as in claim 8 and wherein:
(a) one of said chambers includes $H_2O$ and the other of said chambers another fluid.

10. A nuclear divisional reactor as in claim 8 and
(a) one of said chambers includes an organic fluid composition.

11. A nuclear divisional reactor as in claim 8 and wherein:
(a) one of said chambers includes an inorganic fluid.

12. A nuclear divisional reactor as in claim 1 and wherein:
(a) each of said means for producing useable energy includes a heat exchanger.

13. A nuclear divisional reactor as in claim 1 and wherein:
(a) each of said means for producing useable energy includes a turbine.

14. A nuclear divisional reactor as in claim 12 and wherein:
(a) each of said heat exchangers includes variable capacity energy control means.

15. A nuclear divisional reactor as in claim 13 and wherein:
(a) each of said turbines includes variable capacity energy control means.

16. A nuclear divisional reactor as in claim 1 and wherein:
(a) said core includes a bottom opening.

17. A nuclear divisional reactor as in claim 16 and wherein:
(a) said control rod means is associated with said bottom opening.

18. A nuclear divisional reactor as in claim 1 and including:
(a) means for cooling said core.

19. A nuclear divisional reactor as in claim 1 and wherein:
(a) said plurality of chambers includes four equal chambers radiating from about the central axis of said core.

* * * * *